(12) United States Patent
Väre et al.

(10) Patent No.: US 7,812,887 B2
(45) Date of Patent: Oct. 12, 2010

(54) METHODS AND APPARATUS FOR SIGNALING OFFSETS AND CHANGES IN DIGITAL BROADCAST NETWORKS

(75) Inventors: Jani Väre, Kaarina (FI); Kari S. Virtanen, Merimasku (FI); Jarno Kallio, Turku (FI); Arto Hamara, Turku (FI)

(73) Assignee: Nokia Corporation, Espoo (FI)

( * ) Notice: Subject to any disclaimer, the term of this patent is extended or adjusted under 35 U.S.C. 154(b) by 1207 days.

(21) Appl. No.: 11/132,296

(22) Filed: May 19, 2005

(65) Prior Publication Data

US 2006/0265728 A1   Nov. 23, 2006

(51) Int. Cl.
*H04N 5/44* (2006.01)
(52) U.S. Cl. .................................... 348/552
(58) Field of Classification Search ............... 348/725, 348/730, 460, 473, 474, 552, 553, 461, 726, 348/468, 465; 725/50, 54, 39, 131
See application file for complete search history.

(56) References Cited

U.S. PATENT DOCUMENTS

| | | | | |
|---|---|---|---|---|
| 5,410,369 A | * | 4/1995 | Nakajima | 348/730 |
| 5,617,146 A | * | 4/1997 | Duffield et al. | 348/460 |
| 5,659,366 A | * | 8/1997 | Kerman | 725/34 |
| 5,708,961 A | * | 1/1998 | Hylton et al. | 725/81 |
| 6,252,634 B1 | * | 6/2001 | Yuen et al. | 348/731 |
| 6,271,893 B1 | * | 8/2001 | Kawaguchi et al. | 348/725 |
| 6,278,717 B1 | * | 8/2001 | Arsenault et al. | 370/477 |
| 6,331,876 B1 | * | 12/2001 | Koster et al. | 348/725 |
| 6,452,644 B1 | * | 9/2002 | Shimakawa et al. | 348/730 |
| 6,525,775 B1 | * | 2/2003 | Kahn et al. | 348/460 |
| 6,996,627 B1 | * | 2/2006 | Carden | 709/237 |
| 7,210,160 B2 | * | 4/2007 | Anderson et al. | 725/81 |
| 7,555,019 B2 | * | 6/2009 | Motomura | 370/535 |
| 2002/0198905 A1 | | 12/2002 | Tabatabai et al. | |
| 2003/0014275 A1 | * | 1/2003 | Bearden et al. | 705/1 |
| 2004/0221307 A1 | | 11/2004 | Arai et al. | |

FOREIGN PATENT DOCUMENTS

| | | |
|---|---|---|
| EP | 1475969 | 11/2004 |
| WO | 2004066652 | 8/2004 |

OTHER PUBLICATIONS

"Digital Video Broadcasting (DVB); DVB Specification for Data Broadcasting", ETSI EN 301 192 v1.4.1 (Jun. 2004), pp. 1-78.

(Continued)

*Primary Examiner*—Paulos M Natnael
(74) *Attorney, Agent, or Firm*—Banner & Witcoff, Ltd.

(57) ABSTRACT

Systems and methods are provided for receivers of digital broadband broadcast signals to determine a time of delivery and a version of a particular signaling table. The receiver is able to determine whether an update of the signaling table is needed based on factors such as whether the update applies (e.g., a DVB-H specific change for a mobile terminal in a DVB-H network). The receiver may power down while awaiting delivery of the signaling table (or utilize the radio for other purposes), powering back up in time to receive the signaling table.

33 Claims, 6 Drawing Sheets

OTHER PUBLICATIONS

"Digital Video Broadcasting (DVB); Specification for Service Information (SI) in DVB systems", ETSI EN 300 468 v1.6.1 (Jun. 2004), pp. 1-95.

English Translation of Notification of the First Office Action for CN2006800218700 dated Dec. 5, 2008.

ETSI TR 101 162 V.1.2.1 (Jan. 2001), Technical Report, Digital Video Broadcasting (DVB); Allocation of Service Information (SI) and Data Broadcasting Codes codes for Digital Video Broadcasting (DVB) systems, 31 pages.

ISO/IEC 13818-1(Dec. 2000) Information technology—Generic coding of moving pictures and associated audio information: Systems; 174 pages.

ETSI TR 101 211 V.1.6.1 (May 2000), Technical Report, Digital Video Broadcasting (DVB); Guidelines on Implementation and Usage of Service Information (SI), 55 pages.

* cited by examiner

US 7,812,887 B2

METHODS AND APPARATUS FOR SIGNALING OFFSETS AND CHANGES IN DIGITAL BROADCAST NETWORKS

FIELD OF THE INVENTION

The invention relates to signaling information in digital broadband broadcast networks. More particularly, the invention provides methods and systems for signaling the relevancy and timing of signaling information updates.

BACKGROUND OF THE INVENTION

Digital broadband broadcast networks enable end users to receive digital content including video, audio, data, and so forth. Using a mobile terminal, a user may receive digital content over a wireless digital broadcast network. The digital broadcast signal may include signal information, or metadata, which may provide the mobile terminal with information about available digital content, as well as information about the network and other nearby networks.

In the Digital Video Broadcasting (DVB) context, this metadata may be received by a mobile terminal in the form of Program Specific Information (PSI) and Service Information (SI), collectively referred to as PSI/SI. PSI/SI may be delivered as a series or collection of standardized tables which arrive at a mobile terminal at varying intervals. When information within these tables is updated, new versions of the tables are delivered via the broadcast signal. Mobile terminals, not knowing the arrival time or relevancy of the change, may waste power keeping their radios powered up. Some types of tables may not arrive for up to 30 seconds in some contexts, an intolerable period of time to keep a radio powered up. In addition, in the context of Digital Video Broadcasting for Handhelds (DVB-H), not every version change will be relevant for continued reception of a DVB signal. So a DVB-H terminal awaiting an irrelevant table update may waste power unnecessarily.

Therefore, there is a need in the art for methods and systems which allow receivers of digital broadband broadcast signals to avoid wasting power waiting unknown periods of time for potentially irrelevant metadata updates.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

A first embodiment provides a method for selectively receiving a digitally broadcast signaling table. A mobile terminal receives notification of future delivery of the signaling table, including a version and delivery time. The mobile terminal determines if an update is needed, possibly because of a version change which is relevant to DVB-H in particular. The mobile terminal is then able to power down its radio until just before the needed table is expected to arrive.

A second embodiment provides a method for notifying digital broadcast receivers of impending delivery of updated signaling tables. A time of transmission for a new version of a table is determined and a notification is sent signaling the new table version and time of delivery. At or about the appointed time, the new version of the table or sub_table is transmitted.

BRIEF DESCRIPTION OF THE DRAWINGS

The present invention is illustrated, by way of example and not limitation, in the accompanying figures in which like reference numerals indicate the same or similar elements and in which.

DETAILED DESCRIPTION OF THE DRAWINGS

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
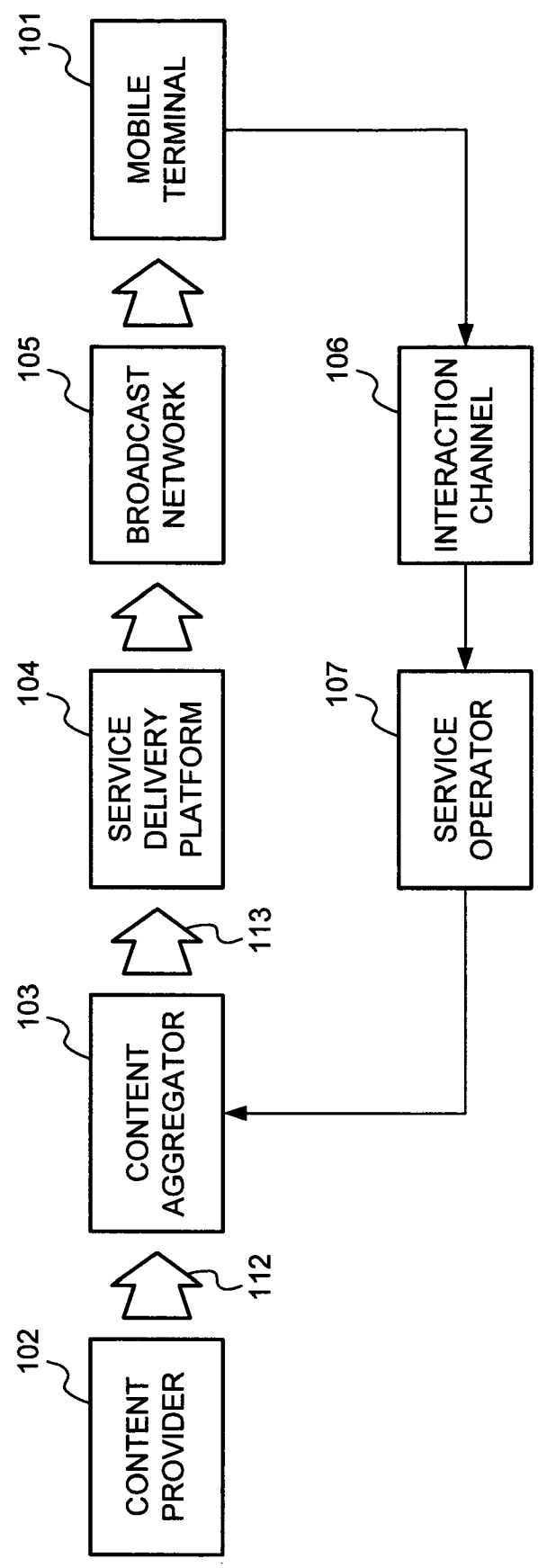
FIG. 1 illustrates a suitable digital broadband broadcast system in which one or more illustrative embodiments of the invention may be implemented.

FIG. 1 illustrates a suitable digital broadband broadcast system in which one or more illustrative embodiments of the invention may be implemented. Systems such as the one illustrated here may be utilized by a digital broadband broadcast technology, for example Digital Video Broadcast—Handheld (DVB-H). Examples of other digital broadcast standards which may utilize the invention include Digital Video Broadcast—Terrestrial (DVB-T), Integrated Services Digital Broadcasting—Terrestrial (ISDB-T), Advanced Television Systems Committee (ATSC) Data Broadcast Standard, Digital Multimedia Broadcast—Terrestrial (DMB-T), Terrestrial Digital Multimedia Broadcasting (T-DMB), Digital Audio Broadcasting (DAB), and Digital Radio Mondiale (DRM). Other digital broadcasting standards and techniques, now known or later developed, may also be used.

Digital content may be created and/or provided by content provider 102 and may include video signals, audio signals, data, and so forth. For example, content provider 102 may be providing a video signal of an international sporting event. Content provider 102 may deliver content 112 to content aggregator 103, who may provide content 112 in the form of a service 113 to service delivery platform 104 for eventual delivery to a user via mobile terminal 101. Different content arriving at content aggregator 103 may be provided as multiple services to service delivery platform 104.

Service delivery platform 104 may bundle service 113 (plus other services from content aggregator 103) along with metadata about offered services and their delivery. Metadata incorporated with content in a DVB system may comprise a series of standardized data tables. Exemplary standards for metadata (also known as program specific information and service information (PSI/SI)) used in digital video broadcasting are found, among other places, in the following European Telecommunications Standards Institute standards documents: "Digital Video Broadcasting (DVB): Specification for Service Information (SI) in DVB Systems," ETSI EN 300 468 (latest version 1.6.1), and "Digital Video Broadcasting (DVB): DVB Specification for Data Broadcasting," ETSI EN 301 192 (latest version 1.4.1).

Broadcast network 105 transmits the digital content provided by system delivery platform 104 as transport streams (e.g., MPEG-TS streams) to mobile terminal 101, where content and metadata may be unbundled and utilized. Broadcast network 105 may also transmit transport streams provided by other service delivery platforms. Broadcast network 105 may use time-sliced transmissions in order to deliver content in high-bandwidth radio bursts as opposed to transmitting a constant lower bandwidth signal. Broadcast network 105 may alternate between transmitting multiple "channels" of digital content by interleaving bursts with different content (e.g., send a first portion of a first set of content during a first burst, a first portion of a second set of content during a second burst, . . . and eventually return to sending the next portion of the first set of content during a subsequent burst, and then a next portion of the second set of content during a next burst, and so forth). Depending on the channel selected, mobile terminal 101 may only need to power up its receiving radio for short periods of time at known intervals—a power savings for mobile terminal 101.

Mobile terminal 101 may utilize some form of interaction channel 106 in order to communicate with service operator 107. This interaction channel may include a cellular network, or some other system for relaying messages from mobile terminal 101 to service operator 107. Messages may be sent via a two-way audio connection (e.g., phone call), via short message service (SMS), via multimedia message service (MMS), via a web browser, or via some other communication scheme. By communicating with service operator 107, mobile terminal 101 may be enabled to consume restricted or for-pay content. Service operator 107 may enable this authorization by communicating with content aggregator 103.

Figure 2:
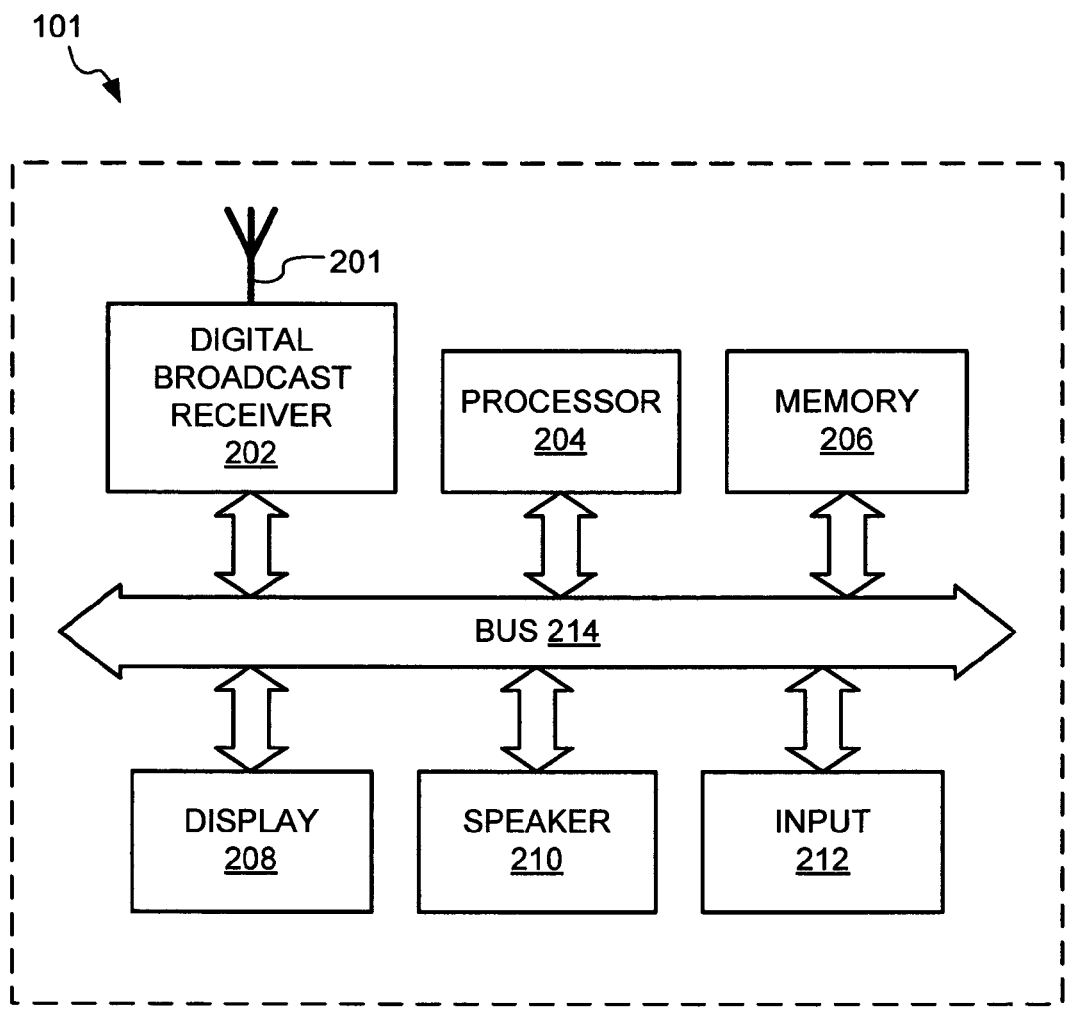
FIG. 2 illustrates a functional block diagram of a suitable mobile terminal in which one or more illustrative embodiments of the invention may be implemented.

FIG. 2 illustrates a functional block diagram of mobile terminal 101 in which one or more illustrative embodiments of the invention may be implemented. Mobile terminal 101 may include digital broadcast receiver 202, which may include antenna 201. Radio signals transmitted by broadcast network 105 are received via antenna 201 and passed to receiver 202. Receiver 202 may decode consumable digital content from the received signals. Receiver 202 may also include, in various embodiments, a processor (e.g., a microcontroller) and/or memory. Digital content may additionally or alternatively be decoded by processor 204. Processor 204 may also enable digital content to be consumed in the form of video for output via one or more displays 208 or audio for output via speaker and/or earphones 210. Processor 204 may also carry out the methods described herein according to the invention. Digital content may also be stored in memory 206 for future processing or consumption.

Memory 206 may also store program specific information and/or service information (PSI/SI), including information about digital content available in the future or stored from the past. A user of mobile terminal 101 may view this stored service information on display 208 and select an item of digital content for viewing, listening, or other uses via input 212, which may take the form of a keyboard, keypad, scroll wheel, or other input device(s) or combinations thereof. When digital content is selected, processor 204 may pass information to receiver 202, so that the receiver may act appropriately (e.g., tune a radio or filter signals based on PSI/SI in order to yield specific digital content for the user). Service information may be encoded within the same digital bursts which deliver other forms of digital content to mobile terminal 101. Digital content and PSI/SI may be passed among functions within mobile terminal 101 using bus 214.

Various methods, operations, and the like described herein may, in various embodiments, be implemented in hardware and/or in software. Hardware may include one or more integrated circuits. For example, in various embodiments, the methods described may be performed by specialized hardware, and/or otherwise may not be implemented in general purpose processors. One or more chips and/or chipsets may be employed, including one or more application-specific integrated circuits (ASICs).

Figure 3:
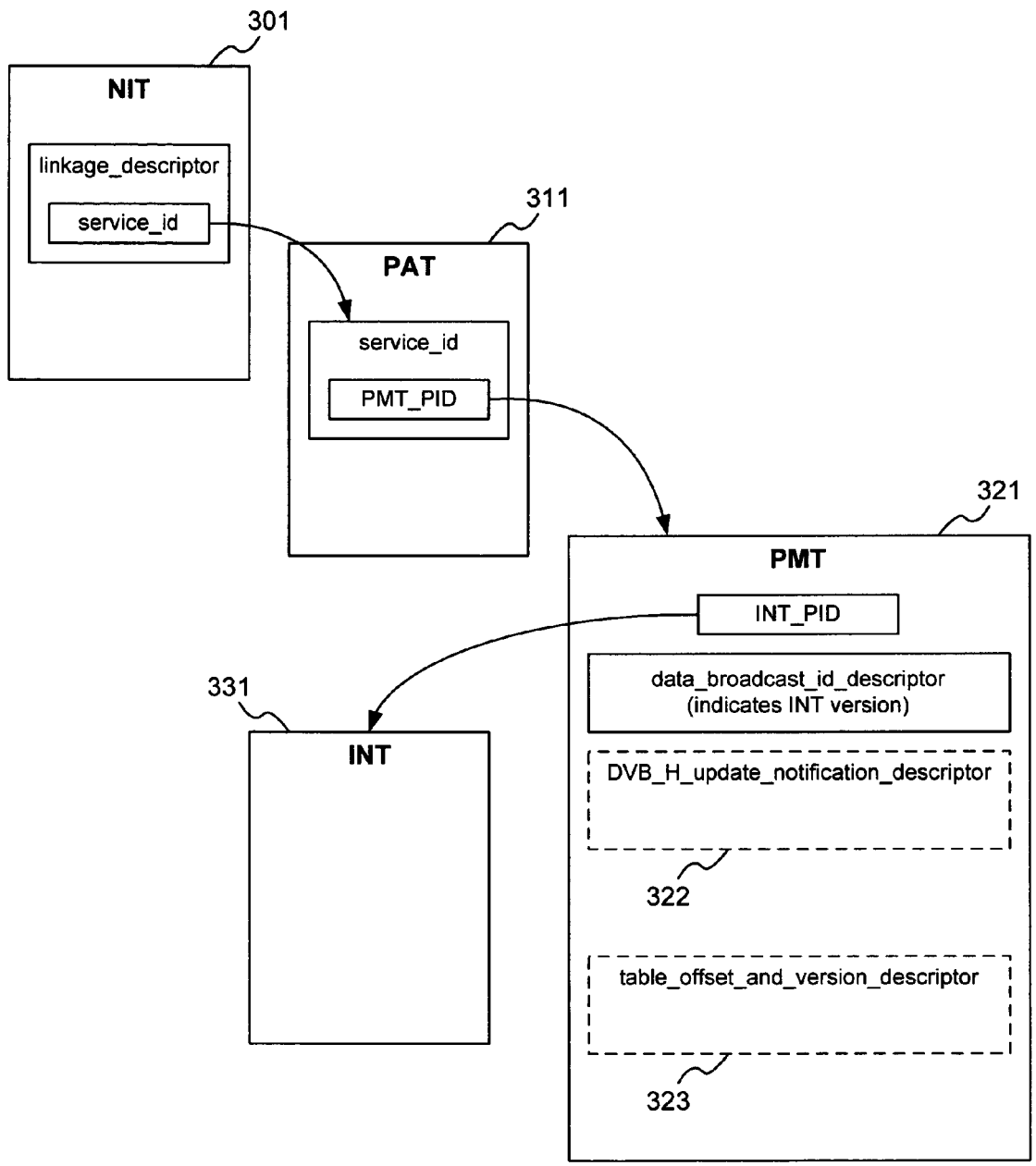
FIG. 3 depicts representations of digital video broadcasting metadata according to one or more illustrative embodiments of the invention.

FIG. 3 depicts representations of digital video broadcasting metadata according to one or more illustrative embodiments of the invention. In the context of the digital video broadcasting (DVB) standard, the metadata, better known as program specific information (PSI) and service information (SI), are integral to the receipt of DVB signals. Although DVB metadata is described in some detail, other embodiments using other digital broadcast standards include signaling standards similar to PSI/SI for delivering data about the content being broadcast.

PSI/SI metadata is formed by a transmission system (service delivery platform 104 and/or broadcast network 105) as a set of tables carried within DVB transmissions. PSI/SI tables provide a mechanism to signal information concerning the services conveyed within a digital video broadcasting transmission. PSI/SI may be perceived as being similar to a table of contents which enable mobile terminal 101 to select desired services from transmission content. Each PSI/SI table is transmitted and re-transmitted within a particular interval or range of intervals. PSI/SI tables may be broken up and transmitted as sub_tables and/or sections.

Network Information Table (NIT) 301 is one of the tables that make up PSI/SI in the DVB standard. The table identifies the network and provides information on the multiplexed transport streams included in DVB transmissions. NIT table 301 maps the accompanying transport streams to the physical radio frequencies carrying them. NIT table 301 may also provide linkage to other tables so that mobile terminal 101 is able to discover the location of digital content within each transport stream. This linkage to IP/MAC Notification Table (INT) 331 is depicted in FIG. 3. Linkage to INT table 331 via NIT table 301 is accomplished via Program Association Table (PAT) 311 and Program Map Table (PMT) 321. PAT table 311 provides linkage for each service in a transport stream to a corresponding Program Map Table PMT table 311. The Program Map Table in turn provides additional information about services, including linkage to the IP/MAC Notification Table (INT) 331. Each transport stream contains at least one INT for each service delivery platform providing content. Moreover, each INT table provides mapping for the IP streams (i.e. Internet Protocol network addresses) of the corresponding service delivery platform 104.

Conventionally, when a change occurs in one of the PSI/SI tables, a new version of the table must be retrieved by mobile terminal 101. In the case of INT table 331, this change may be indicated when a new version of PMT 321 is received, including an indicator of the latest INT table version. By DVB convention, PMT tables are retransmitted every 25 milliseconds (ms) to 100 milliseconds (ms). However, INT tables may be retransmitted anywhere from every 25 ms to fully 30 seconds. In this case, upon determining that a new version of INT table 331 exists, mobile terminal 101 may need to keep its radio powered up for an additional 25 ms to 30 seconds while waiting for the new version of the modified table to be transmitted. Once received, the changes within a table (e.g. NIT table 301) may not be relevant to DVB for handhelds (DVB-H). For example, if the same network provides both DVB-H and DVB terrestrial (DVB-T) services, changes might only be relevant to DVB-T terminals. Leaving the radio powered up while waiting for the new table in this situation may be an unnecessary waste of power.

Aspects of the invention provide for a new descriptor which may be added to conventional PSI/SI tables. A DVB-H update notification descriptor 322 may be included within frequently delivered PMT table 321. When a new version of PMT table 321 is detected by mobile terminal 101, the descriptor 322 can be interpreted. DVB-H update notification descriptor 322 includes information signaling whether the version change is a DVB-H specific change, and therefore whether the new table version will need to be retrieved immediately. If the change is not DVB-H specific, as indicated by descriptor 322, then mobile terminal 101 may not need to wait with radio powered up to receive the new version of the table. The syntax for the DVB-H update notification descriptor 322 may resemble that set forth in Table 1:

TABLE 1

Syntax for the DVB_H_update_notification_descriptor

| Syntax | No. of Bits | Identifier |
|---|---|---|
| DVB_H_update_notification_descriptor( ){ | | |
|   descriptor_tag | 8 | uimsbf |
|   descriptor_length | 8 | uimsbf |
|   reserved_future_use | 2 | uimsbf |
|   NIT_DVB_H_update_flag | 1 | uimsbf |
|   NIT_version | 5 | uimsbf |
| } | | |

The identifier "uimsbf" indicates an unsigned integer most significant bit first. The semantics of the table are described below:

descriptor_tag: The descriptor tag is an 8-bit field which uniquely identifies the descriptor.

descriptor_length: The descriptor length is an 8-bit field specifying the total number of bytes of the data portion of the descriptor following the byte defining the value in this field.

reserved_future_use: 2 bits reserved for future use.

NIT_DVB_H_update_flag: If this flag is set to "0," then no DVB-H related information has changed in the NIT since the previous descriptor was sent, even if the NIT version has changed. If this flag is set to "1," then the NIT_version field shall reflect DVB-H specific changes appear in the NIT.

NIT_version: This 5-bit field is the version number of a sub_table. This value may be the same as the version number found in the NIT section header. The version number shall be incremented by 1 when a change in the information carried within the sub_table occurs. When it reaches the value 31, it wraps back around to 0.

Alternative methods of reporting DVB-H specific changes are certainly available. Alternative syntaxes may be added to existing tables or descriptors.

DVB-H change notifications may also be coupled with new descriptors and/or new tables which provide information on new versions and the timing of their delivery. As stated above, under conventional approaches, when a new version of a table is detected (e.g., PMT table 321 indicates a new INT version within a data_broadcast_id_descriptor), mobile terminal 101 must keep its radio powered up until the new INT table is delivered. This may take up to 30 seconds, and will unnecessarily drain the power source of mobile terminal 101.

Aspects of the invention provide a new descriptor and/or a new PSI/SI table which may provide information on delivery times of new table versions. Using such information, mobile terminal 101 may power down its radio and then power back up at the appointed time, saving power in the process. Mobile terminal 101 may continue to use its radio for other functions in the interim (e.g., receive a time-sliced data burst), but it does not need to keep the radio powered up for extended periods unnecessarily.

A new table_offset_and_version_descriptor descriptor 323 is set forth below in some detail. One or more descriptors may be included within any existing PSI/SI table to inform mobile terminal 101 of the delivery time and version of other tables. For example, if a version change has occurred for a particular IP/MAC Notification Table (INT) 331, the new descriptor may be added to the oft-delivered Program Map Table (PMT) 321. The delivery time provided may be an absolute delivery time, or it may be an amount of time relative to the current time, also known as a time offset. Table 2 presents one possible syntax for such a descriptor:

TABLE 2

Syntax for the table_offset_and_version_descriptor

| Syntax | No. of Bits | Identifier |
|---|---|---|
| table_offset_and_version_descriptor( ){ | | |
|   descriptor_tag | 8 | uimsbf |
|   descriptor_length | 8 | uimsbf |
|   for(i=0;i<N;i++){ | | |
|     table_id | 8 | bslbf |
|     reserved_future_use | 2 | uimsbf |
|     version_number | 5 | uimsbf |
|     DVB_H_flag | 1 | uimsbf |
|     next_table_offset | 16 | uimsbf |
|     table_information_length | 8 | uimsbf |
|     if(table_id==0x4C){ | | |
|       action_type | 8 | uimsbf |
|       platform_id | 24 | uimsbf |
|     } | | |
|     else { | | |
|     } | | |
|   } | | |
| } | | |

The identifier "bslbf" indicates bit string, left bit first. The semantics of the table are described below:

table_id: This is an 8-bit identifier identifying the table associated with information carried within each iteration of the loop of this descriptor.

version_number: This 5-bit field is the version number of the table identified by the table_id.

DVB_H_flag: This one bit flag indicates whether the latest sub_table change is DVB_H specific. If the flag value is set to "1," the latest changes indicated with version_number change have impact on the DVB-H receiver. Otherwise version_number change does not have impact on the DVB_H receiver.

next_table_offset: This 16-bit field indicates the time for the next transmission of the sub_table identified by the information provided in the fields that follow. Offset time is signaled as milliseconds (e.g. offset of 3500 milliseconds is encoded as 0x0dac.).

table_information_length: This field indicates the length of the fields that follow.

action_type: This is an 8-bit field that shall be equal to the action_type field defined in the INT. (see European Telecommunications Standard Institute (ETSI) Standard EN 300 192 (latest version 1.4.1)).

platform_id: This is a 24-bit field which serves as a label to identify a given IP/MAC platform. Allocations of the value of this field are found in the ETSI Technical Report TR 101 162 (latest version 1.6.1).

Table delivery and version information may also be provided in a new PSI/SI section. This section may be sent with the same frequency as a PMT table (25-100 ms). Table 3 presents one possible syntax for a new table:

TABLE 3

Syntax for the Table Offset and Version section

| Syntax | No. of Bits | Identifier |
|---|---|---|
| table offset and version section( ){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   descriptors_loop_length | 12 | uimsbf |
|   for(i=0;i<N;i++){ | | |
|     descriptor( ) | | |
|   } | | |
|   reserved_future_use | 4 | bslbf |
|   table_offset_and_version_loop_length | 12 | uimsbf |
|   for(i=0;i<N;i++){ | | |
|     table_id | 8 | bslbf |
|     reserved_future_use | 2 | uimsbf |
|     version_number | 5 | uimsbf |
|     DVB_H_flag | 1 | uimsbf |
|     next_table_offset | 16 | uimsbf |
|     table_information_length | 8 | uimsbf |
|     if(table_id==0x4C){ | | |
|       action_type | 8 | uimsbf |
|       platform_id | 24 | uimsbf |
|     } | | |
|     else { | | |
|     } | | |
|   } | | |
|   CRC_32 | 32 | rpchof |
| } | | |

The identifier "uimsbf" indicates unsigned integer most significant bit first. The term "bslbf" indicates bit string, left bit first. The identifier "rpchof" indicates remainder polynomial coefficients, highest order first. The semantics of the table are described below:

table_id: This 8-bit field identifies table type of the section.

section_syntax_indicator: The section_syntax_indicator is a 1-bit field which shall be set to "1".

section_length: This is a 12-bit field, the first two bits of which shall be "00". It specifies the number of bytes of the section, starting immediately following the section_length field and including the CRC. The section_length shall not exceed 1,021 so that the entire section has a maximum length of 1,024 bytes.

network_id: This is a 16-bit field which serves as a label to identify the delivery system, about which the NIT informs, from any other delivery system.

version_number: This 5-bit field is the version number of the sub_table. The version_number shall be incremented by 1 when a change in the information carried within the sub_table occurs. When it reaches value 31, it wraps around to 0. When the current_next_indicator is set to "1", then the version_number shall be that of the currently applicable sub_table defined by the table_id and network_id. When the current_next_indicator is set to "0", then the version_number shall be that of the next applicable sub_table defined by the table_id and network_id.

current_next_indicator: This 1-bit indicator, when set to "1" indicates that the sub_table is the currently applicable sub_table. When the bit is set to "0", it indicates that the sub_table sent is not yet applicable and shall be the next sub_table to be valid.

section_number: This 8-bit field gives the number of the section. The section_number of the first section in the sub_table shall be "0x00". The section_number shall be incremented by 1 with each additional section with the same table_id and network_id.

last_section_number: This 8-bit field specifies the number of the last section (that is, the section with the highest section_number) of the sub_table of which this section is part.

descriptors_loop_length: This 12-bit field gives the total length in bytes of the following descriptors.

table_offset_and_version_loop_length: This is a 12-bit field specifying the total length in bytes of the loops that follow, ending immediately before the first CRC 32 byte.

table_id: This is an 8-bit identifier which identifies the table associated with information carried within each iteration of this descriptor.

version_number: This 5-bit field is the version number of the sub-table. The version_number shall be incremented by 1 when a change in the information carried within the sub_table occurs. When it reaches value 31, it wraps around to 0.

DVB_H_flag: This one bit flag indicates whether the version_number change is DVB-H specific. If flag value has been set to "1" and the value of the version_number field changes, there have been changes in DVB-H specific signaling. Otherwise setting the flag to "0" means version_number changes do not affect DVB_H specific signaling.

next_table_offset: This 16 bit field indicates the time for the next table identified in the table_id field. Offset time is signaled as milliseconds (e.g. offset of 3500 milliseconds is encoded as 0x0dac.).

table_information_length: This field indicates the length of the fields that follow.

action_type: This is an eight-bit field that shall be equal to the action_type field defined in the INT. (see European Telecommunications Standard Institute (ETSI) Standard EN 300 192 (latest version 1.4.1)).

platform_id: This is a 24 bit field which serves as a label to identify a given IP/MAC platform. Allocation of the value of this field are found in the ETSI Technical Report TR 101 162 (latest version 1.6.1).

CRC_32: This is a 32 bit field that contains the CRC value that gives a zero output of the registers in the decoder defined in Annex B of ETSI Standard EN 300 468 (latest version 1.6.1) after processing the entire section.

In a digital broadcast system, when signaling information is about to be updated, receivers may be notified of the impending transmission of a table or sub_table. The digital broadcast system may determine a time for transmitting the table or sub_table. The notification, which may take the form of a descriptor, section or table, may be transmitted including information about the future time at which a particular version of a table or sub_table will be transmitted. Further, the digital broadcast system may determine whether a particular change to the table or sub_table is relevant to DVB-H receivers and include that information with the notification. The table or sub_table itself may then be transmitted at or about the appointed time.

Figure 4:
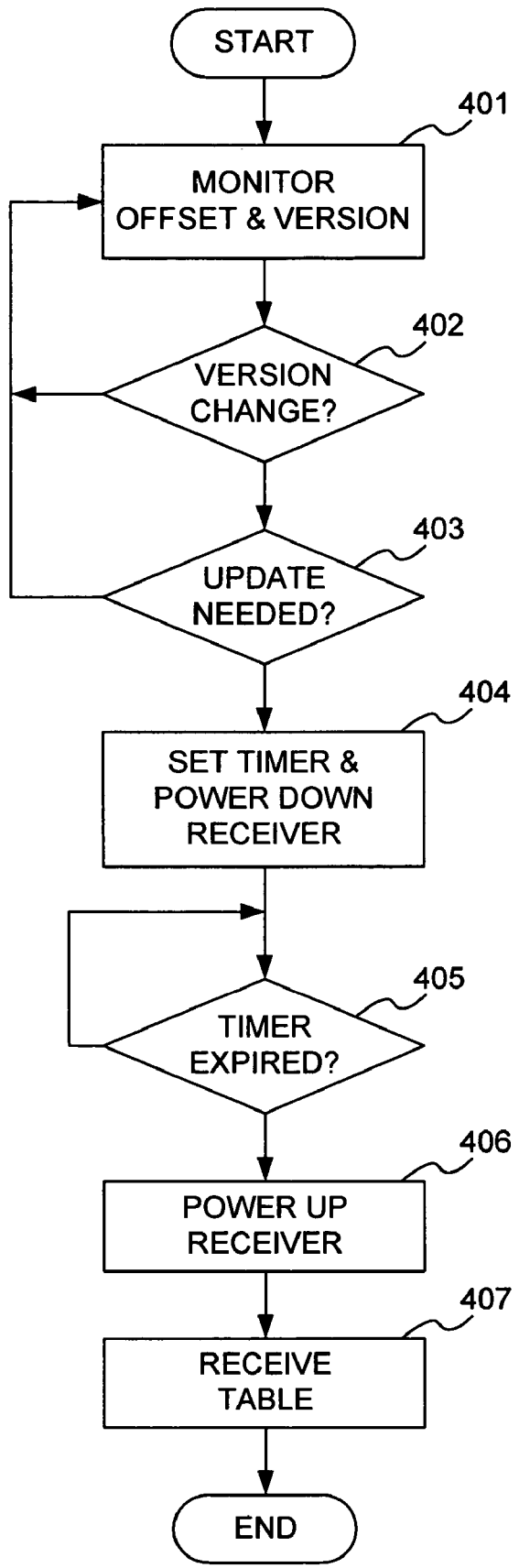
FIG. 4 is a flow diagram of a method for receiving a signaling table using an offset according to one or more illustrative embodiments of the invention.

FIG. 4 is a flow diagram of a method for receiving a signaling table using an offset according to one or more illustrative embodiments of the invention. Such a method may be implemented by mobile terminal 101 at least to save power when receiving PSI/SI signaling tables. At step 401, a digitally broadcast signal is monitored for signaling information indicating the version number and delivery offset for PSI/SI tables. This may be accomplished by capturing the information from incoming signaling tables. For example, delivery and version information may be derived from a Table Offset and Version table, or else from information gleaned by filtering for a table_offset_and_version_descriptor 323 within a Program Map Table (PMT) 321. Fields carried within the table or descriptor may be stored in memory 206 of mobile terminal 101 each time there are changes in the version_number associated with a particular table.

At decision 402, the information stored regarding table versions is evaluated. If there has not been a change, then mobile terminal 101 continues to monitor version and offset at step 401. If, however, there has been a change, then at decision 403, mobile terminal 101 evaluates whether an updated version of the table is needed. Such an evaluation may be based on several factors, but may include evaluating that a table version change is not DVB-H specific as specified by the included flag or descriptor. As such, it may not be necessary for mobile terminal 101 to download the table, and mobile terminal 101 may continue to monitor version and offset back at step 401.

If an updated version of the table is needed, then the offset value associated with the needed table and stored in step 401 is used in setting an internal timer. If receiver 202 is not in use for other purposes (e.g., receiving digital content via a time-sliced burst transmission), then the receiver may be powered down to save power. While the timer is running at decision 405, receiver 202 may be used for other purposes. Once the timer has run, at step 406, if it isn't already powered up, receiver 202 is powered up. Receiver 202 may not power up at exactly the offset time and may be powered up at a time proximate to the offset. For example, receiver 202 may be powered up at a time just prior to that indicated by the offset in anticipation of receiving the needed table. At step 407, the needed table is received by mobile terminal 101, after which the radio may or may not be powered down.

Figure 5:
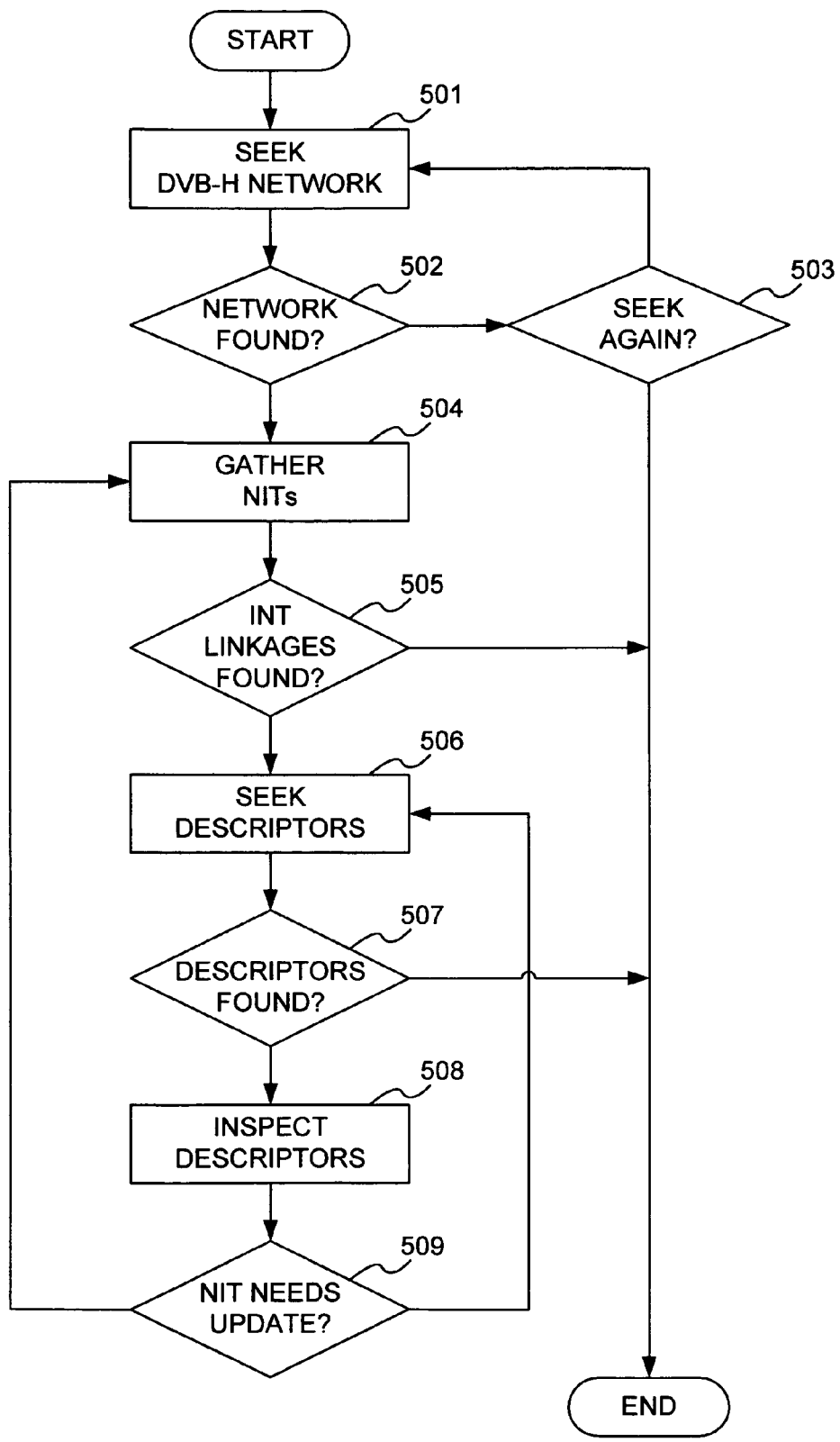
FIG. 5 is a flow diagram of a method for receiving a signaling table using a relevance flag according to one or more illustrative embodiments of the invention.

FIG. 5 is a flow diagram of a method for selectively receiving a signaling table using a relevance flag according to one or more illustrative embodiments of the invention. Such a method may be implemented by mobile terminal 101 and may lead to power savings by preventing the radio from powering up to receive an unneeded table update. At step 501, one ore more DVB-H networks are sought by systematically tuning to signals in a specified frequency range until a DVB-H signal is found. If at decision 502 no DVB-H networks are found, then mobile terminal 101 evaluates whether it should continue seeking networks at decision 503. If not, then the procedure exits; if so, then the networks continue to be sought at step 501. Once a network is found, at step 504, mobile terminal 101 gathers the Network Information Table (NIT) for the currently received network. Mobile terminal 101 may also receive NITs for other nearby networks.

At decision 505, mobile terminal checks to see if any linkages to IP/MAC Notification Tables (INT) are available, using the procedure outlined in FIG. 3. If linkages to INT tables are not found, then the procedure exits. If linkages to INTs are found, then at step 506, DVB-H update notification is sought, possibly by looking for the descriptors or table described above. If no descriptors are found, at decision 507, then the procedure exits. If they are found, then the update flags are inspected at step 508. If, at decision 509, the update flags indicate that a DVB-H specific change has occurred, then the NITs are re-gathered at step 504. If no DVB-H specific change has occurred, then further descriptors are sought and inspected at step 506.

Although the descriptors and tables described above may consume more bits of bandwidth, the benefits their use provides to a user of mobile terminal 101 may be valuable. Among the benefits is a decrease in power consumption, both in not wasting power receiving and processing unnecessary table updates, and in not wasting power listening for the next delivery of a needed table update.

Figure 6A:
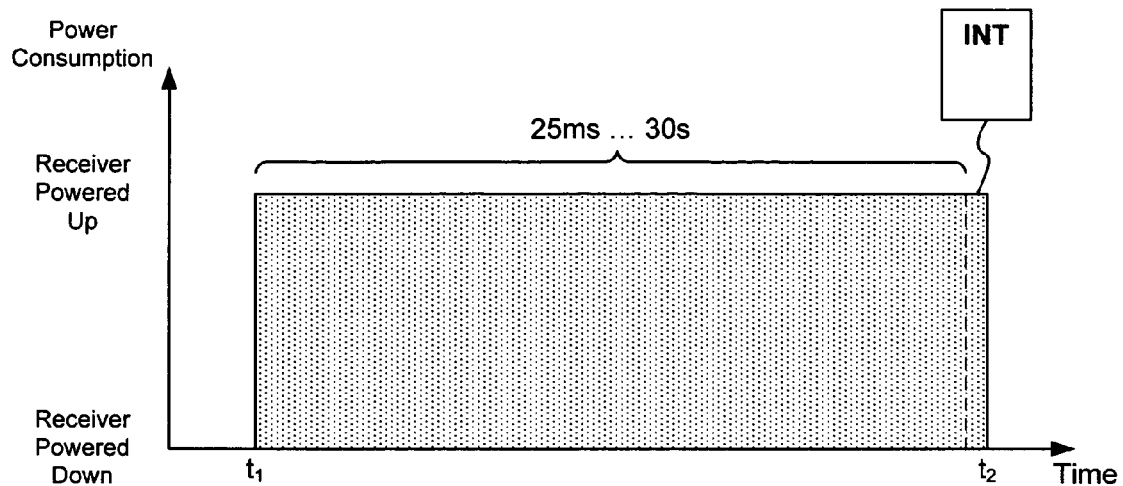
FIGS. 6A and 6B illustrate power consumption over time for a mobile terminal according to one or more embodiments of the invention.
Figure 6B:
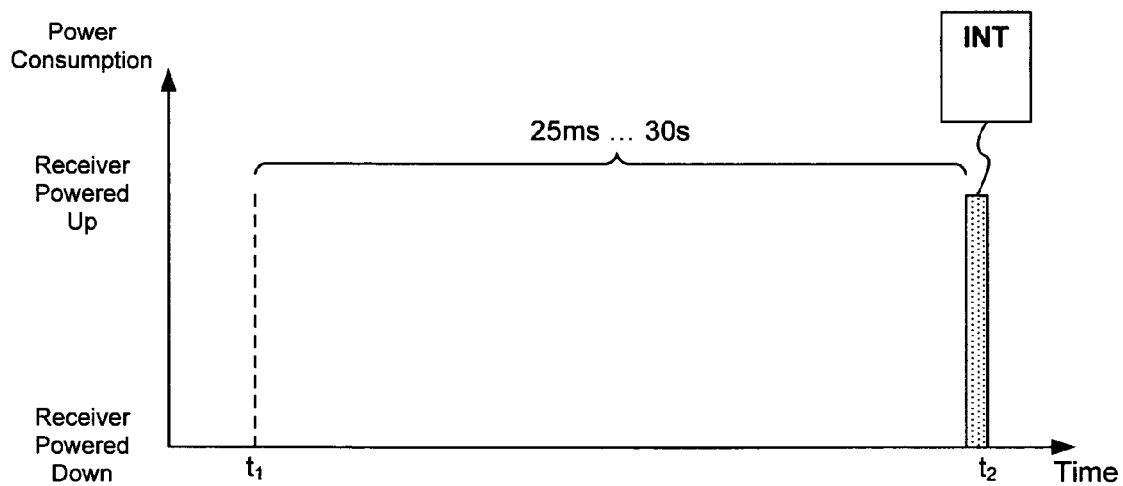

FIGS. 6A and 6B illustrate power consumption over time for a mobile terminal according to one or more embodiments of the invention. FIG. 6A demonstrates mobile terminal 101 leaving a receiver powered up while waiting for an updated INT table. FIG. 6B demonstrates mobile terminal 101 powering down while waiting for an updated INT table. At time $t_1$ in both figures, mobile terminal 101 determines that a new version of an INT table is needed. Mobile terminal 101 in FIG. 6A does not know when to expect the table to be delivered by a digital broadcast signal, and so must leave its receiver powered up for up to 30 seconds monitoring all traffic looking for the specific table. Mobile terminal 101 in FIG. 6B, either through a descriptor or table, knows when to expect delivery of the INT, and may leave its receiver powered down (unless it is otherwise needed) until delivery is anticipated. Depending on the length of time until the next transmission of the INT table, mobile terminal 101 in FIG. 6A may waste a significant amount of power monitoring the digital broadcast signal.

While aspects of the invention have been described with respect to specific examples, including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   a mobile terminal receiving a delivery time of a digitally broadcast signaling table;
   said mobile terminal determining that an update of the digitally broadcast signaling table is required for the mobile terminal; and
   in response to the determining that the update is required for the mobile terminal, then
   powering down a receiver of the mobile terminal;
   powering up the receiver at a time proximate to the delivery time; and
   receiving the updated digitally broadcast signaling table.

2. The method of claim 1, wherein the determining that the update of the digitally broadcast signaling table is required comprises determining that the table has changed.

3. The method of claim 2, wherein the determining that the update of the digitally broadcast signaling table is required comprises determining that the table change comprises a change specific to a digital video broadcasting for handhelds (DVB-H) service standard.

4. The method of claim 3, wherein the determining that the table change comprises a change specific to the digital video broadcasting for handhelds (DVB-H) service standard comprises receiving a signaling descriptor indicating a change specific to the DVB-H service standard.

5. The method of claim 1, wherein the digitally broadcast signaling table is broadcast using a digital video broadcast (DVB) standard.

6. The method of claim 5, wherein the receiving of the delivery time of the digitally broadcast signaling table comprises receiving a signaling descriptor comprising delivery time information.

7. The method of claim 6, wherein the signaling descriptor is contained within a Program Map Table.

8. The method of claim 5, wherein the receiving of the delivery time of the digitally broadcast signaling table comprises receiving another signaling table comprising the delivery time.

9. The method of claim 8, wherein the receiving of the another signaling table comprising the delivery time comprises receiving a table relating to a table offset and a table version.

10. The method of claim 1, wherein the digitally broadcast signaling table comprises at least one of program specific information or service information.

11. The method of claim 1, wherein said mobile terminal determines that the update of the digitally broadcast signaling table is required by locating a received descriptor indicating that the update affects a type of broadcast service standard receivable by the mobile terminal.

12. The method of claim 11, wherein the type of broadcast service standard is digital video broadcasting for handhelds (DVB-H).

13. A method comprising:
 determining a transmission time when an updated version of a signaling table will be transmitted;
 forwarding a notification of the transmission time for digital broadcast transmission, said notification including relevance information identifying a type of broadcast service standard for which changes in the updated version of the signaling table are relevant, wherein the type of broadcast service standard is digital video broadcasting for handhelds (DVB-H); and
 forwarding the signaling table for digital broadcast transmission at a time proximate to the transmission time.

14. The method of claim 13, wherein the notification is transmitted using a digital video broadcasting (DVB) standard.

15. The method of claim 14, wherein the notification comprises a signaling descriptor.

16. The method of claim 14, wherein the notification comprises another signaling table.

17. A device comprising:
 a processor;
 a receiver configured to receive a digital broadband broadcast signal; and
 a memory storing machine-executable instructions that, when executed, cause the device to perform the following:
  receiving a delivery time for a digitally broadcast signaling table;
  storing the delivery time in the memory;
  determining that an update of the digitally broadcast signaling table is required for the device; and
  in response to the determining:
   powering down the receiver;
   subsequently powering up the receiver at a time proximate to the delivery time; and
   receiving the digitally broadcast signaling table.

18. The device of claim 17, wherein the digital broadband broadcast signal comprises a digital video broadcasting (DVB) signal.

19. The device of claim 18, wherein the digital broadband broadcast signal comprises a digital video broadcasting for handhelds (DVB-H) signal.

20. The device of claim 17, wherein the receiving of the delivery time of the digitally broadcast signaling table comprises receiving a signaling descriptor comprising delivery time information.

21. The device of claim 20, wherein the signaling descriptor is contained within a Program Map Table.

22. The device of claim 17, wherein the receiving of the delivery time of the digitally broadcast signaling table comprises receiving another signaling table comprising the delivery time.

23. The device of claim 22, wherein the receiving of the another signaling table comprising the delivery time comprises receiving a table relating to a table offset and a table version.

24. The device of claim 17, wherein the determining that the update of the digitally broadcast signaling table is required comprises receiving a notification that the digitally broadcast signaling table has a specific change to a DVB-H service standard.

25. A method comprising:
 receiving a first signaling table via a DVB-H signal, the first signaling table comprising notification of a time offset and a version of a second signaling table;
 determining that an update of the second signaling table is required based at least in part on a DVB-H update flag included with the first signaling table;
 powering down a receiver;
 powering up the receiver at a time proximate to the time offset; and
 receiving the second signaling table via the DVB-H signal.

26. The method of claim 25, wherein the notification comprises contents of a descriptor included as part of the first signaling table.

27. A computer-readable medium, storing instructions to cause a processor to perform the following:
 receive a broadcast signaling table at a mobile device;
 receive an indication that a new version of the signaling table will be available, the indication including a service type identifier identifying a type of broadcast service standard whose information is changed in the new version;
 determine that changes in the new version do not include changes to a type of broadcast service standard received by the mobile device; and
 in response to the determining, retain an outdated version of the signaling table in the mobile device.

28. The computer-readable medium of claim 27, wherein the type of broadcast service standard received by the mobile device is a digital video broadcasting for handhelds (DVB-H) service standard.

29. The computer-readable medium of claim 27, further storing instructions to cause the processor to:
 determine a time when the new version of the signaling table will be transmitted; and
 power down a receiver of the mobile device until the time when the new version will be transmitted.

30. A computer-readable medium, storing instructions to cause a processor to perform the following:
 determine a transmission time when an updated version of a signaling table will be transmitted;
 forward a notification of the transmission time for digital broadcast transmission, said notification including relevance information identifying a type of broadcast service standard for which changes in the updated version of the signaling table are relevant, wherein the type of broadcast service standard is digital video broadcasting for handhelds (DVB-H); and forward the signaling table for digital broadcast transmission at a time proximate to the transmission time.

31. The computer-readable medium of claim 30, further storing instructions to cause the processor to transmit the notification using a digital video broadcasting (DYB) standard.

32. The computer-readable medium of claim 30, wherein the notification comprises a signaling descriptor.

33. The computer-readable medium of claim 32, wherein the notification comprises another signaling table.

* * * * *

UNITED STATES PATENT AND TRADEMARK OFFICE
CERTIFICATE OF CORRECTION

| | | |
|---|---|---|
| PATENT NO. | : 7,812,887 B2 | Page 1 of 1 |
| APPLICATION NO. | : 11/132296 | |
| DATED | : October 12, 2010 | |
| INVENTOR(S) | : Väre et al. | |

It is certified that error appears in the above-identified patent and that said Letters Patent is hereby corrected as shown below:

Column 14, Claim 31, Line 1: Please delete "(DYB)" and insert --(DVB)--.

Signed and Sealed this
Seventh Day of June, 2011

David J. Kappos
*Director of the United States Patent and Trademark Office*